United States Patent [19]

Ferri

[11] Patent Number: 4,882,053
[45] Date of Patent: Nov. 21, 1989

[54] POROUS FILTER MEDIA SUPPORT PLATE

[76] Inventor: Joseph E. Ferri, 206 Lester Ave., Shillington, Pa. 19607

[21] Appl. No.: 172,519

[22] Filed: Mar. 24, 1988

[51] Int. Cl.$^4$ ............................................. B01D 23/18
[52] U.S. Cl. ................................ 210/293; 210/510.1; 210/541; 428/310.5
[58] Field of Search ............ 210/289, 291, 293, 510.1, 210/541; 29/163.6; 228/178; 428/310.5, 313.5, 304.4; 248/346, 346.1

[56] References Cited

PUBLICATIONS

Campbell, J.. "Porous Metal Sheet," from Materials and Methods, Apr. 1955, vol. 41, pp. 98–101.
Publication entitled "Filter Under Drain Plate" (drawing).
Publication entitled "Traveling Bridge Filter".
Publication entitled "ABF TM Packager Filter".

Primary Examiner—Richard V. Fisher
Assistant Examiner—C. Upton
Attorney, Agent, or Firm—Charles H. Lindrooth

[57] ABSTRACT

Disclosed is a porous filter support plate of the kind used in traveling bridge filters for the support of granular filter media used in the filtration of waste water, industrial liquors or baths, or for filtration of potable water in a water purification system. The support plates are formed of porous, heat-fusible materials, for example, a thermoplastic organic material, joined together by heat-fused butt joints and/or reinforced by vertical zones which extend vertically through the plates in which the material has been brought to a molten state and is pressed together to form a dense, solid, non-porous mass.

4 Claims, 2 Drawing Sheets

POROUS FILTER MEDIA SUPPORT PLATE

FIELD OF THE INVENTION

This invention relates to porous filter support plates, useful particularly for traveling bridge filters or the like for the filtration of waste water or industrial liquors or baths or for filtration of potable water as an adjunct to a water purification system.

BACKGROUND AND PRIOR ART

Filtration systems of the kind referred to are generally comprised of a number of elongated, generally rectangular, filter cells or beds spaced in side-by-side relationship. Each cell contains a single granular filter media, such as sand, or two kinds of media, such as sand and pulverized anthracite coal. Water to be filtered is delivered from above to flood the cells, the water flowing downwardly through the media by gravity leaving particulate matter entrapped in the spaces between the media particles. The bed of filter material within each cell rests on a support plate commonly called a drainplate which in the past was formed of a porous ceramic material. More recently, porous drainplates made from thermoplastic materials have been substituted for the drainplates formed of ceramic materials. Amongst the advantages of such plastic plates are substantially reduced weight and material costs, lower labor and shipping costs, and simplified installation. The plates are tough and resilient and can be easily joined together. They can be made longer than the ceramic plates thereby minimizing joints. They can be easily hand-sawed for custom field fits where required.

In filtering equipment of the kind described, a traveling backwash hood mounted over the cells moves from cell to cell and is used in conjunction with a pump to periodically backwash each cell and remove particulate and other debris from the drainplate and the filtration media. An advantage of this equipment is that while one cell is shut down, others are in operation, thereby providing substantially continuous filtration.

A problem with thermoplastic drainplates of the kind referred to is that they tend to bow or bend in planes extending transversely of their length under the combined loading of the filter media and the water. When overloaded, the sides of the plates pull away from the vertical sidewalls of the cells. This results in a channelling of the water down the sides of the cells around the sides of the drainplates thereby reducing the efficiency of the filter and of the backflushing operations.

SUMMARY AND OBJECTS OF THE INVENTION

According to the invention, porous drainplates of a heat-fusible material are provided having longitudinally-spaced, relatively narrow heat-fused non-porous zones extending vertically through the plates and from one side edge to the other. Preferably these zones are formed by the application of heat transversely of a solid porous plate to form a narrow heat-fused non-porous zone or by butt welding pieces in end-to-end relationship or by a combination of both methods. By either method, these zones form rigid beams integrally with the porous plates to resist bending or bowing and substantially eliminate channeling of the water being treated around edges of the plates. As compared with pieces which have lap joints mastic bonded in end-to-end relationship it has been found that the butt-welded pieces and the pieces having transversely-extending fused zones are approximately ten times as resistant to bending or bowing.

Accordingly, a primary objective of the invention is the provision of heat-fused zones extending in vertical planes transversely through porous heat-fusible drainplates.

A related objective of the invention is the treatment of such plates in a manner which imparts substantially more rigidity for a given plate thickness than has been heretofore possible.

The foregoing and other objects of the invention are achieved in a porous drainplate, wherein the plate supports a bed of filter media within each filtration cell wherein the plate has pores sized to retain the filter media and solid particulate matter while permitting the passage of filtered water downwardly through the filter media and the plate and the passage of washing water in the reverse direction first through the plate and then through the filter media, wherein the plate is provided with at least one relatively narrow heat-fused non-porous zone consisting essentially of the material which comprises the plate, the heat-fused non-porous zone extending in a plane which passes vertically from the top to the bottom and from one side edge to the other of the plate.

In preferred form, the drainplate comprises a thermoplastic material, for example, an organic polymeric material.

DETAILED DESCRIPTION OF THE INVENTION

Figure 1:
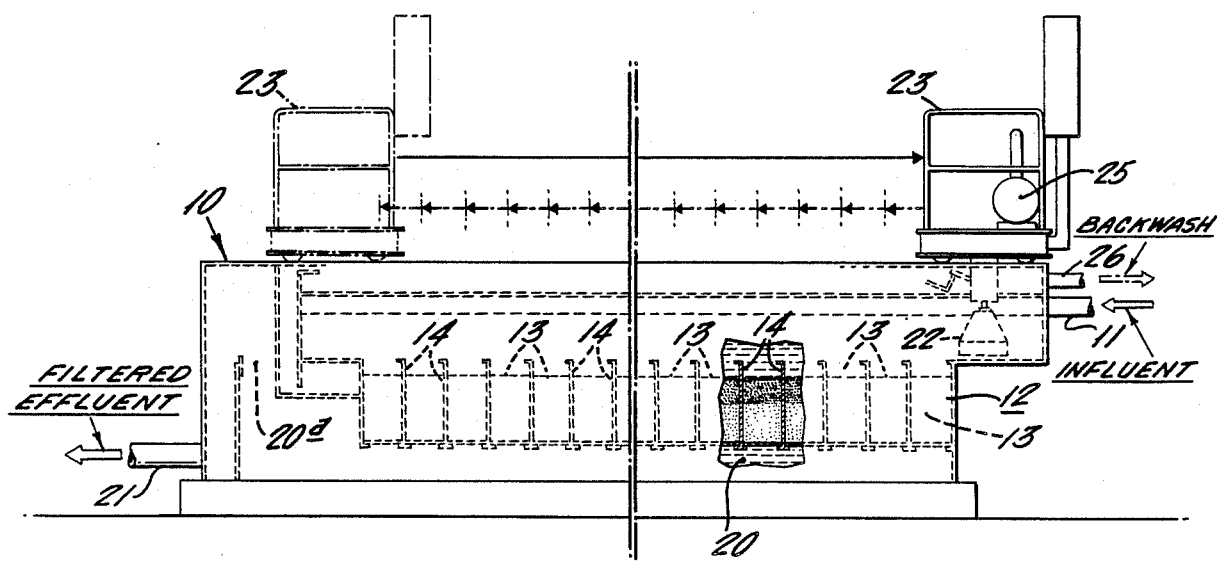
FIG. 1 shows in schematic form an elevational view of a filtration apparatus of the kind incorporating drainplates of the present invention.

Reference is first made to FIG. 1 which shows in schematic form a typical filtration unit 10 incorporating the invention. In a purification system comprising the filtration unit 10, water containing suspended solids is delivered through an influent pipe 11 to the filtration unit schematically indicated by the reference character 12. The filtration unit comprises a rectangular tank containing a plurality of relatively narrow cells 13 which are separated by vertically-extending partitions 14 which extend transversely from one tank sidewall to the other.

Figure 2:
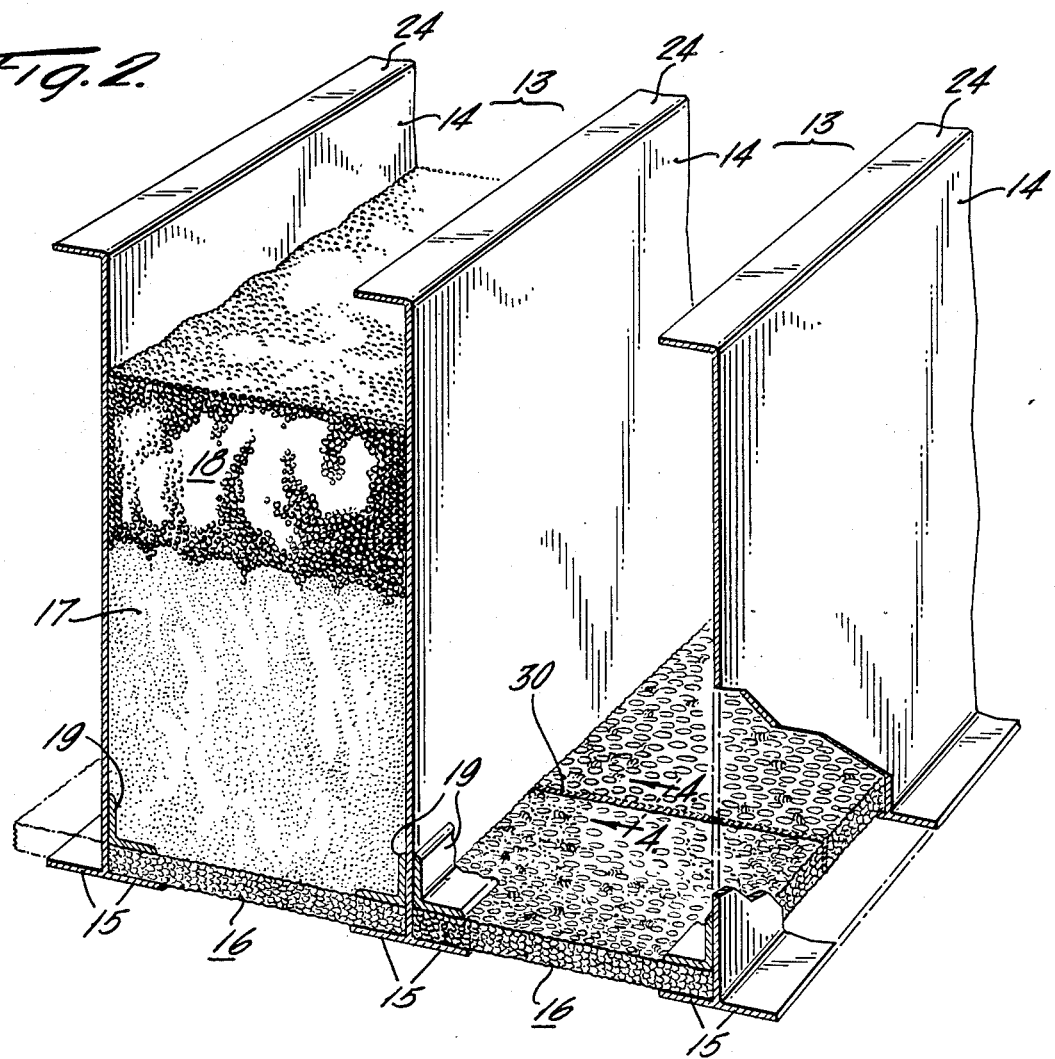
FIG. 2 is a perspective view on an enlarged scale with respect to FIG. 1, of a single filtration cell of the filtration apparatus shown in FIG. 1.

Fragments of such cells are shown in FIG. 2. Support means for drainplates for the filter media, as described hereinafter, comprise horizontally-extending flanges 15 which project inwardly from the bottoms of partitions 14 and extend lengthwise of each cell. Porous filter media drainplates 16 to be described more particularly hereinafter extend lengthwise of the cells and are supported on the flanges 15. These plates support the granular filter material which typically comprises a bed of sand shown at 17 and a bed of pulverized anthracite coal 18 which rests upon the sand bed 17. A sealant bead not shown may be applied along the upper surface of supports 15 to effect a seal with the side wall along the edges of the plates. In addition, a retaining angle, a portion of which is shown at 19, is secured to each wall 14 to hold plates 16 in place. The sealant should preferably also be applied along the upper perimeter of each plate so that a good seal is effected between the plate and the side walls.

Water to be filtered is delivered through the influent pipe 11 and floods the upper surfaces of each of the cells 13. The water passes downwardly through the beds by gravity leaving the suspended solids behind within the beds. The filtered water flows through the porous drainplates 16 into an underdrain or clearwell 20. An effluent pipe 21 is in liquid communication with the clearwell for discharge of filtered effluent. A spillway or dam 20a intermediate the clearwell and the effluent pipe 21 controls the level of water in the clearwell.

As is known in the art, a traveling backwash hood 22 which is carried by a horizontal movable carriage 23 periodically moves from cell to cell. The hood has a sealing strip around its lower perimeter which forms a seal with flange sealing surfaces 24 which extend around the perimeter of each cell and is also provided with a suction manifold, not shown. Once a seal is formed with the sealing surfaces 24, a backwash pump 25 is activated to cause a flow upwardly through the cell, then through the hood 22 and outwardly through a backwash conduit 26. The backwash operation, as described, purges each cell of suspended solids and other debris removed by the filter materials within the cell. The seal is then broken and the hood moved to the next cell, the arrangement providing substantially continuous operation through the cells not being backwashed and continuous periodic backwashing of all cells.

Cells of the type in which the drainplates of the invention are utilized typically have a width (w) of 7 to 12 inches or even more, a length (l) up to 16 feet or even more, and a thickness (t) of about one inch. In the past, porous thermoplastic plates formed of polyethylene have been provided either having a length as long as the cell or, if shorter and joined together, are joined by a lap joint with the surfaces forming the joint are glued together with a mastic sealant.

Figure 3:
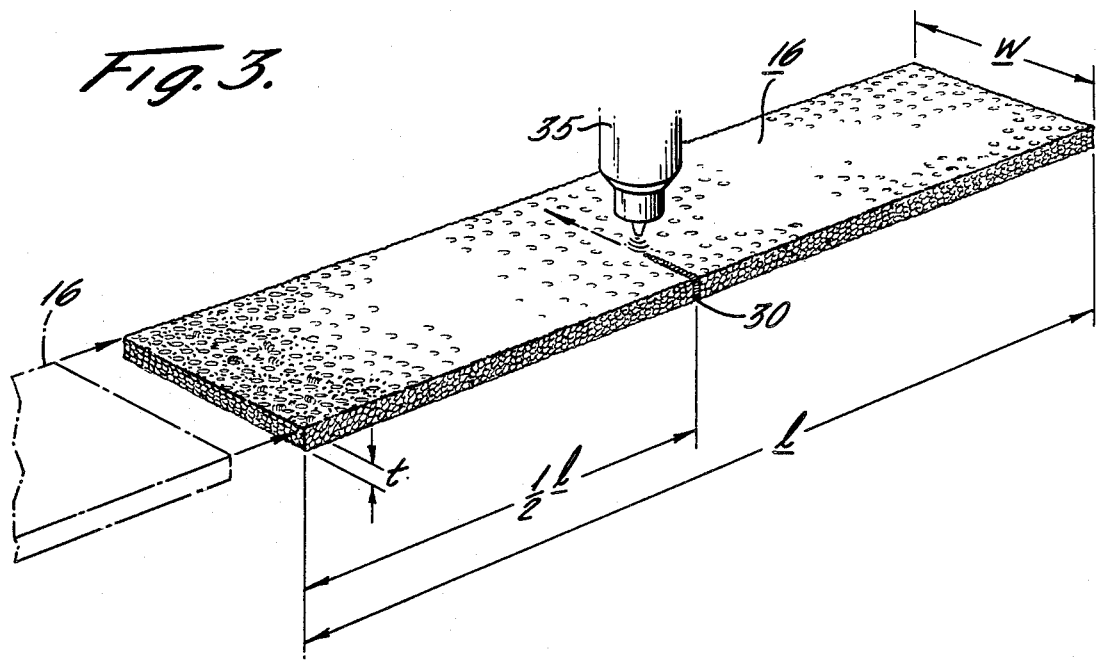
FIG. 3 is a perspective view of a drainplate of the kind comprising the present invention.
Figure 4:
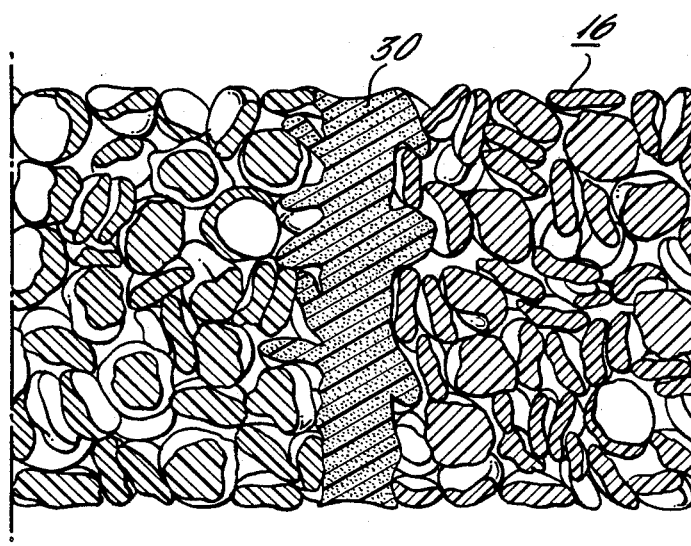
FIG. 4 is a detail sectional view taken on line 4—4 of the drainplate of FIG. 2.

In carrying out the invention, the plates 16 are formed in known manner, for example, by sintering a heat-fusible particulate material, for example, a thermoplastio, organic, material such as high-density polyethylene to the desired rectangular shape. Other heat-fusible plastic materials such as polypropylene may be employed if desired. The plates so formed are then provided with relatively narrow heat-fused, relatively dense, non-porous zones 30 as shown in FIG. 4, which zones extend through the plates in vertical planes from the top surface to the bottom surface of each plate. Zones 30 are formed by application of heat to the ends of two pieces of the thermoplastic material while joining the ends together and then allowing the pieces to cool until the material solidifies and forms a rigid non-porous joint. Alternatively, where the fusion zones 30 are formed intermediate the ends of the plate, sufficient heat and pressure are applied to cause the material to reach the melting point in a zone extending through the piece and from side edge to side edge as by use of any suitable heating means represented by transversely-movable electrical heating element 35 in FIG. 3. In effect, the zones are rigid, non-porous integrally formed beams having a depth of the thickness of the plate, which beams are effective to withstand the bending forces supplied by the load of filter media.

The number of fusion zones for a particular application will vary somewhat depending on the dimensions of the drainplates and the loading to which they are exposed and can be determined after a few field tries. The zones in a typical application may vary from about one every two feet to one every four feet. As illustrated in FIG. 3, combinations of zones formed by butt welding two plates together and forming zones within a length of drainplate may be employed.

EXAMPLE

Porous media drainplates having a thickness of one inch, a width of eight inches and a length of four feet are formed of a polymer comprised of a high density polyethylene of molecular weight about 800,000 as sold by Phillips Plastics, product number M550. This material is provided in bead or pellet form, the pellet size being one-eighth of an inch diameter. Pellets of the polymer of one-eighth of an inch diameter are joined in known manner by heating in a rectangular mold to a temperature of 360° F., at a pressure of about 700 psi, to form a rectangular porous plate having a weight of three pounds per square foot, a bulk density of 38 to 40 pounds per cubic foot and a pore volume of 40% to about 55%. Such plates have a capability of retaining sand particles down to about 0.45 mm in diameter. A melted zone is then formed by heating with a fusion plate heater while the plates are held together. When the surfaces are in a molten state the heater is removed and pressure is applied to the plate ends by air cylinders until the molten polymer fills the pores within the zone and solidifies, resulting in a narrow non-porous zone or web.

Examples of other materials that can be used as resins in products made according to the foregoing examples, and which have been found to perform satisfactorily are as follows:

(1) High density, high molecular weight polyethylene resin 10571—containing 45% mica filler as supplied by the Ampacet Corporation;
(2) High density, high molecular weight polyethylene resin #10647 containing 50% of a talc filler, as supplied by the Ampacet Corporation;
(3) A nylon resin type 6/12 as supplied by E. I. Dupont DeNemours & Co.; and
(4) A poly(vinyl chloride) resin Geon 8714 as supplied by the B. F. Goodrich Company.

I claim:
1. An elongated substantially rectangular filter media support plate comprised of a porous heat-fusible organic plastic material, said plate being exposed to a loading by a porous filter media, the pores in the support plate being sized to retain the filter media and waste particulate matter while permitting passage of water in a first direction first through the filter media and then through the support plate and in the reverse direction first through the support plate and then through the filter media, said plate comprising means forming at least one relatively narrow, non-porous heat-fused zone extending across the plate from one side edge to the other and from the upper surface to the lower in a plane extending substantially perpendicularly to said upper and lower surfaces and to said side edges, each said zone sub-dividing the plate into end-to-end abutting porous sub-sections, said plate being performed with each said heat-fused zone forming an integral part of said plate with the composition of the material in the said zone being homogeneous with the material outside of the zone and forming within the zone a substantially rigid, load-bearing beam extending from said one side edge to the other and from the said upper surface to the said lower surface.

2. A support plate according to claim 1 wherein said material is a high density polyethylene.

3. An elongated substantially rectangular filter media support plate comprised of a porous heat-fusible organic plastic material, said plate being exposed to loading by a porous filter media, the pores in said support plate being sized to retain the filter media and waste particulate matter while permitting passage of water in a first direction first through the filter media and then through the support plate and in the reverse direction first through the support plate and then through the filter media, said plate comprising a plurality of narrow, non-porous heat-fused zones extending from one side edge to the other and from the upper surface to the lower in planes extending substantially perpendicularly to said upper and lower plate surfaces and to said side edges, said heat-fused zones sub-dividing the plate into end-to-end abutting porous sub-sections, each of said heat-fused zones integrally joining the abutting ends of the porous sub-sections.

4. A support plate according to claim 3 wherein said material is a high density polyethylene.

* * * * *

UNITED STATES PATENT AND TRADEMARK OFFICE
CERTIFICATE OF CORRECTION

PATENT NO. : 4,882,053

DATED : Nov. 21, 1989

INVENTOR(S) : Joseph E. Ferri

It is certified that error appears in the above-identified patent and that said Letters Patent is hereby corrected as shown below:

Column 3, line 48, "plastio" should read as --plastic--.

Column 4, line 67, "performed" should read as --preformed--.

Signed and Sealed this

Twenty-fifth Day of June, 1991

Attest:

HARRY F. MANBECK, JR.

*Attesting Officer*

*Commissioner of Patents and Trademarks*